Patented Aug. 8, 1939

2,168,468

UNITED STATES PATENT OFFICE 2,168,468

MANUFACTURE OF FLUID PHOSPHATIDE PREPARATIONS

Karl Braun, Frohnau, near Berlin, and Richard Rosenbusch, Dahlem, near Berlin, Germany, assignors to J. D. Riedel-E. de Haen Aktiengesellschaft, Berlin-Britz, Germany No Drawing. Application June 28, 1938, Serial No. 216,400. In Germany May 6, 1935

4 Claims. (Cl. 252—1)

This invention relates to the manufacture of fluid phosphatide preparations; and it comprises methods of making such fluid phosphatide compositions from the wax-like phosphatides, such as lecithin, etc., wherein a minor amount of castor oil acids is incorporated with the phosphatide, the amount of said acid so incorporated being sufficient to form a phosphatide preparation fluid at room temperature and wherein sometimes a minor amount of poly-ethanolamine is also added in addition to the said fatty acids to further improve such fluid preparations and it also comprises the fluid phosphatide preparations so obtained, these new phosphatide preparations being particularly useful for incorporation into soaps.

As is well known, the phosphatides, such as lecithin, etc., are wax-like glycerides which soften at elevated temperatures to more or less oily liquids. For instance, substantially pure lecithin is a substance with a clear, paraffine-like appearance and softens to more or less of an oil at 60° C. The commercial lecithin preparations now available contain varying amounts of other constituents including oil; for instance, commercial vegetable lecithin sometimes contains 25–30 per cent of oil in addition to the phosphatide. These commercial phosphatide preparations vary somewhat in their softening or melting point but all of them are more or less waxy solids at room temperature.

The wax-like nature of the phosphatides hinders their technical utilization, for instance in the manufacture of lecithin soaps as shown post. Obviously it is not feasible to add any phosphatides dissolved in the usual organic solvents in making lecithin soaps, since the distilling off of the solvent is not practical in most cases.

We have now found that phosphatides, particularly lecithin may be rendered fluid by adding a minor amount of the mixed acids produced by the saponification of castor oil. In one embodiment of this invention 100 parts of a commercial vegetable lecithin containing 25–30% of oil is stirred with only 3 parts of a commercial castor-oil-fatty-acid and a product is obtained, which also when cooled has lost its solid nature. Also by adding for instance 25 to 50 parts of the mixed acids to 75 parts of the aforesaid lecithin a perfectly fluid product is obtained. Further, these fluid preparations may be prepared from oilfree phosphatides and in doing so 45 parts of the mixed acids from castor oil are added to 50 parts of lecithin practically free from oil dissolved in 100 parts of ether and the solution so obtained is then distilled to remove the ether. If desired the solution may be filtered through carbon prior to removing the ether.

The mixed fatty acids obtainable by saponifying castor oil often show considerable milky opacity which increases during storage. Depending on the used amount also the lecithin-products may be opaque. To separate such precipitates by filtering or the like would cause an important advance in prices for said products, let alone that the liquids may become opaque anew when stored.

Furthermore we have found that by adding very small quantities of polyethanolamines, particularly of triethanolamines, the aforesaid opacity is prevented. When the fluid lecithin described above containing 75 parts of commercial lecithin and 25 parts of the mixed fatty acids is prepared with the perfectly milky "castor oil fatty acid" of the market, a product is obtained, which while fluid, is opaque, looking poor and which settles when stored. By adding only 2.5% of commercial triethanolamine which contains some diethanolamine, this opacity can be obviated very much and this may be done completely by adding 5%–10% or more.

The fluid lecithin-products made according to the present invention are specially suited for the manufacture of lecithin-soaps, and being fluid they can be readily and uniformly admixed with soaps. The waxy nature of the phosphatides, heretofore used and added only after saponification, gives rise to difficulties both in the incorporation and in the homogeneous distribution of same into the soaps. This results in non-uniform mixtures and in formation of stains when stored, and the like. All such difficulties are overcome by adding the fluid lecithin-products of the present invention, to the soap in lieu of the solid waxy phosphatides, previously used in the prior methods of making lecithin soaps. Moreover they have the advantage, that the foam-value of the soaps manufactured therewith is not lowered by the lecithin content.

We claim:

1. As a new composition of matter suitable for incorporation into soaps and liquid at room temperature, a fluid phosphatide preparation consisting of 75 parts of a commercial, oil-containing phosphatide, 3 to 50 parts of the mixed acids from castor oil and a minor amount of poly-ethanolamines.

2. The composition of claim 1 wherein such fluid phosphatide preparation contains the polyethanolamines in an amount of 2.5 to 10 per cent of the mixture.

3. As a new composition of matter suitable for incorporation into soaps and liquid at room temperature, a fluid phosphatide preparation consisting of 75 to 100 parts of a commercial, oil-containing lecithin, 3 to 50 parts of castor oil fatty acids and 2.5 to 10 parts of tri-ethanolamine, said composition being a clear fluid at room temperature.

4. As a new composition of matter, a lecithin composition consisting of 75 parts of commercial vegetable lecithin containing 25 to 30 per cent of oil, 25 parts of the mixed fatty acids of castor oil and 2.5 parts of triethanolamine.

KARL BRAUN.
RICHARD ROSENBUSCH.